No. 819,357. PATENTED MAY 1, 1906.
J. MacDOUGALL.
FILTER FOR PURIFYING WATER.
APPLICATION FILED MAR. 19, 1900. RENEWED MAR. 14, 1906.

4 SHEETS—SHEET 1.

Witnesses:
T. L. Mockabee
J. L. Lawlor

Inventor:
John MacDougall, by
Chas. Williamson, his Atty

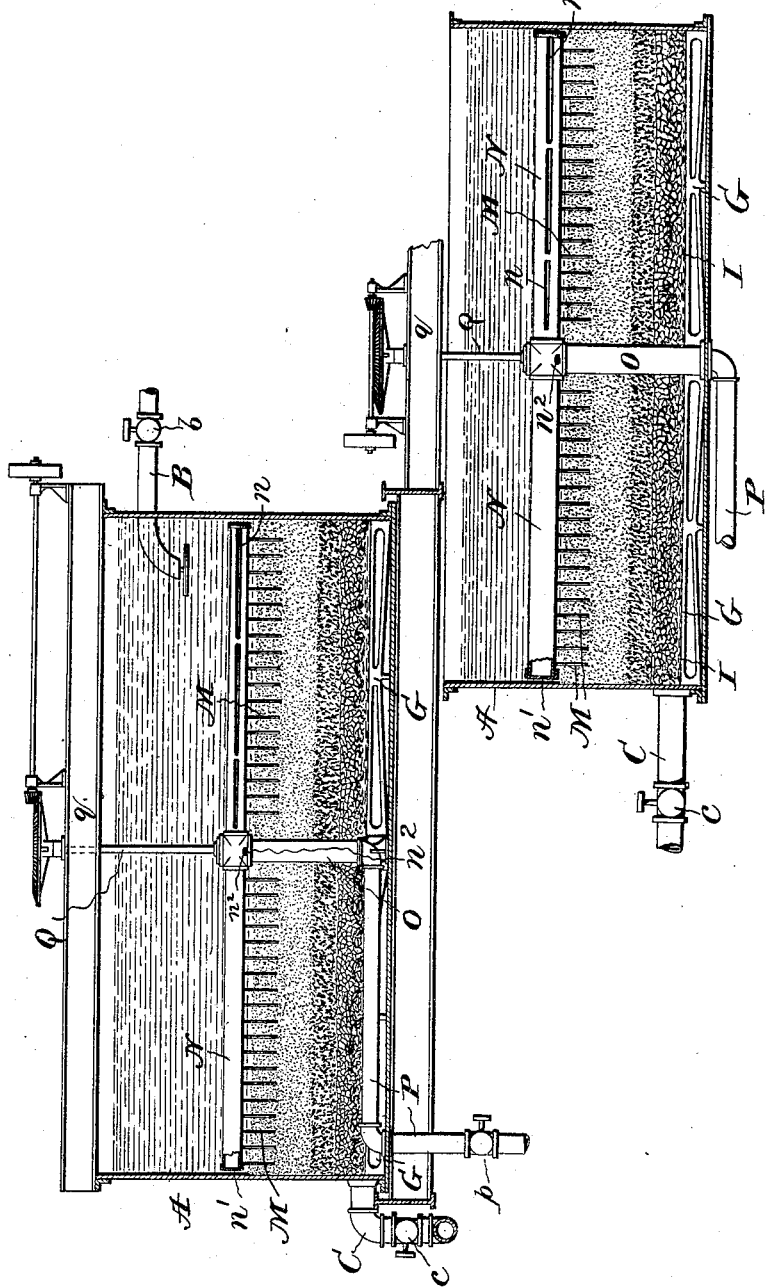

No. 819,357. PATENTED MAY 1, 1906.
J. MacDOUGALL.
FILTER FOR PURIFYING WATER.
APPLICATION FILED MAR. 19, 1900. RENEWED MAR. 14, 1906.
4 SHEETS—SHEET 3.
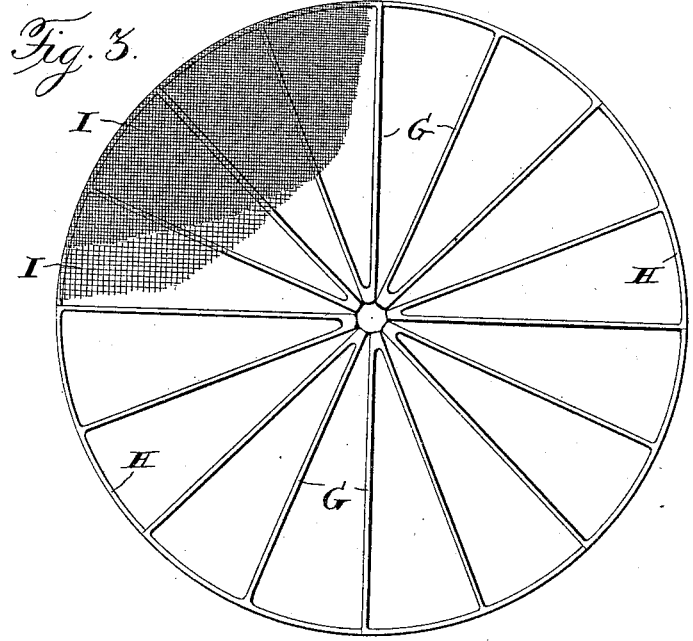
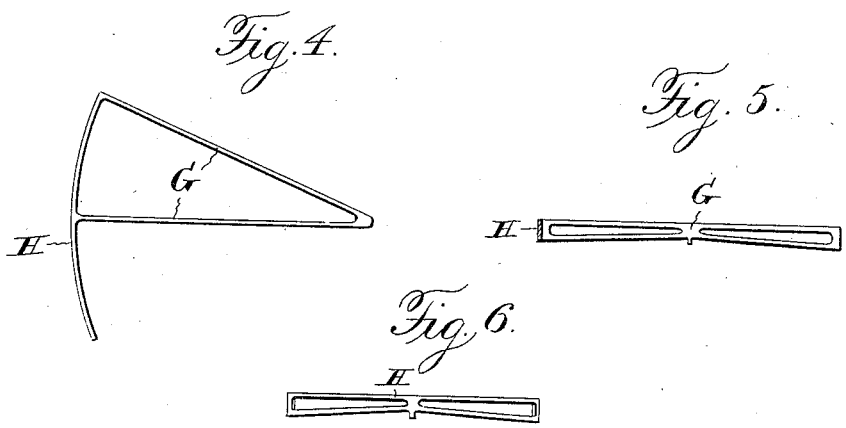
Witnesses:
Jas E Hutchinson.
J. L. Lawlor.
Inventor.
John MacDougall, by
Chas. J. Williamson, his Atty.

No. 819,357. PATENTED MAY 1, 1906.
J. MacDOUGALL.
FILTER FOR PURIFYING WATER.
APPLICATION FILED MAR. 19, 1900. RENEWED MAR. 14, 1906.

4 SHEETS—SHEET 4.

Witnesses:
Jas. E. Hutchinson
J. L. Lawlor

Inventor.
John MacDougall, by
Chas. J. Williamson, his Atty.

UNITED STATES PATENT OFFICE.

JOHN MacDOUGALL, OF DETROIT, MICHIGAN, ASSIGNOR, BY DIRECT AND MESNE ASSIGNMENTS, TO FRANK E. KIRBY, OF DETROIT, MICHIGAN, AND WILLIAM W. NEAR, OF MONTREAL, CANADA.

FILTER FOR PURIFYING WATER.

No. 819,357.          Specification of Letters Patent.          Patented May 1, 1906.

Application filed March 19, 1900. Renewed March 14, 1906. Serial No. 306,011.

*To all whom it may concern:*

Be it known that I, JOHN MACDOUGALL, of Detroit, in the county of Wayne, and in the State of Michigan, have invented certain new and useful Improvements in Filters for Purifying Water; and I do hereby declare that the following is a full, clear, and exact description thereof, reference being had to the accompanying drawings, in which—

Figure 1:
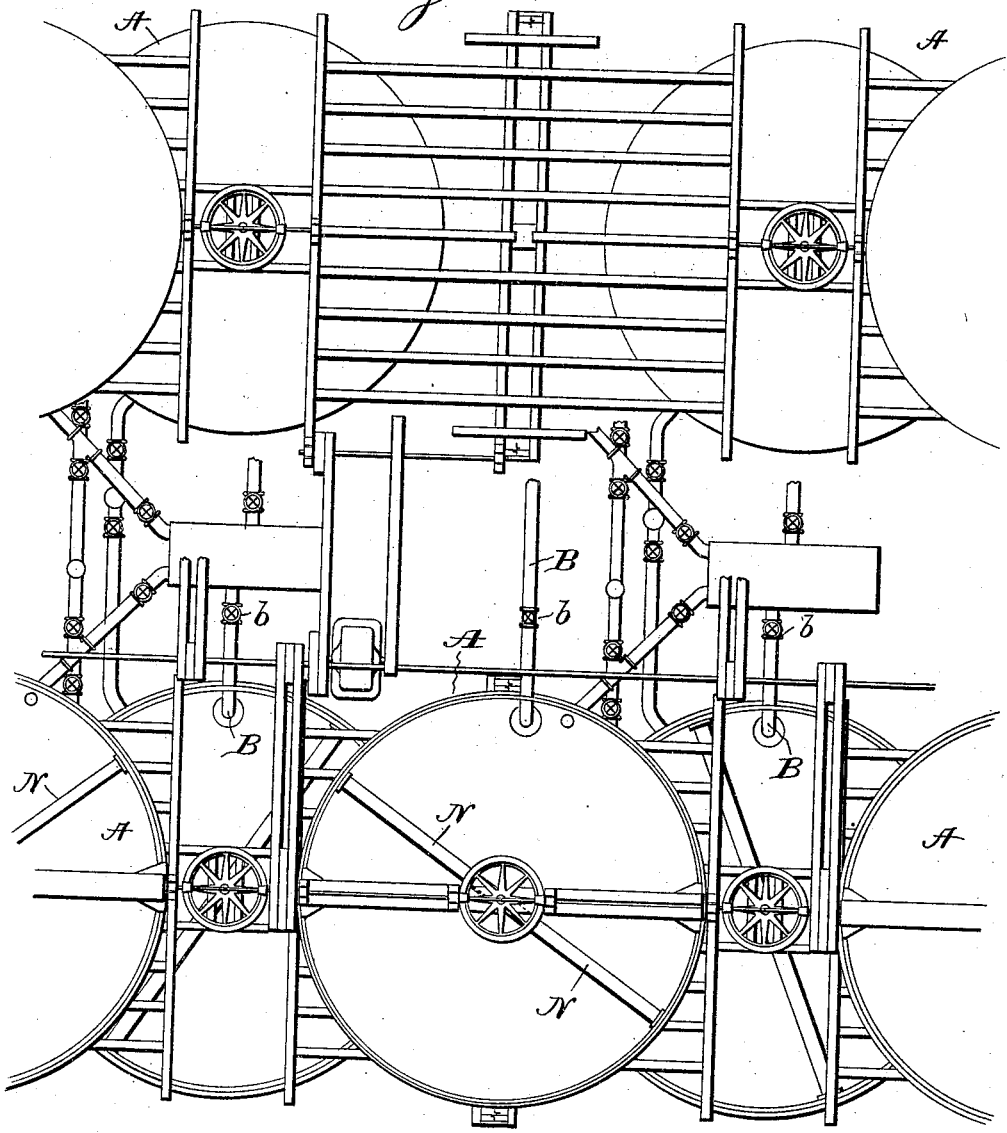
Figure 8:
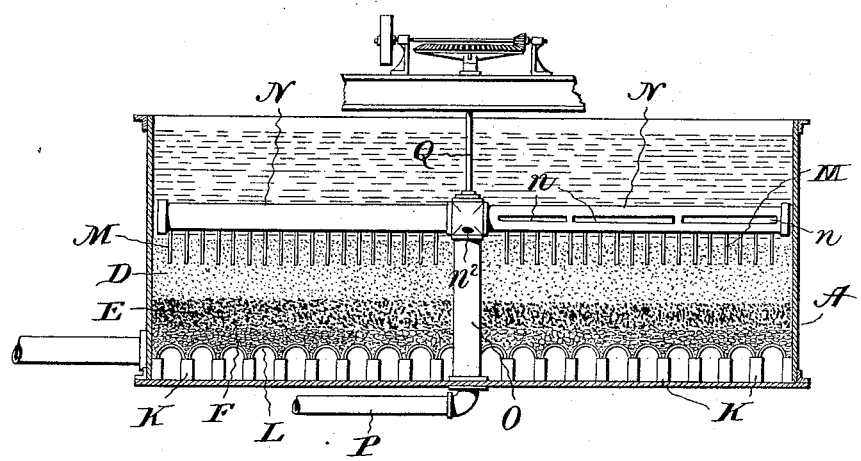

Figure 1 is a top plan view of part of a water-purifying plant provided with filters embodying my invention; Fig. 2, a vertical section of two of the filters; Fig. 3, a top plan view of one form of false bottom or support for the filter-bed that may be used; Fig. 4, a detail top plan view of one of the segments of the false bottom; Fig. 5, a detail side elevation thereof; Fig. 6, an end elevation of said segment; Fig. 7, a vertical cross-section through one of the members of such segment; Fig. 8, a vertical section through a filter having another form of false bottom or support, and Fig. 9 a detail plan view of a portion of the support shown in Fig. 8.

Letters of like name and kind refer to like parts in each of the figures.

The object of my invention is to provide an improved construction of water-filters which besides other advantages, to be hereinafter set forth, will be characterized by the very important one of requiring a minimum of water for cleansing or washing; and to this end my invention consists in the filtering apparatus having the construction and arrangements of parts substantially as hereinafter specified and claimed.

In the carrying of my invention into practice a suitable tank or receptacle A is employed, which has an inlet-pipe B, by which the water to be filtered is conducted to it, and an outlet-pipe C for the filtered water. Within the tank A and resting on a suitable false bottom or support is a bed of filtering material, formed, preferably, of a top layer D of fine filtering-sand, a second layer E of coarse sand, and a third layer F of broken stone, which rests directly on the false bottom.

The false bottom or support I prefer to employ comprises an open frame or grid resembling a wheel composed of thin radial bars G and G, corresponding to the spokes, and a circular bar H, corresponding to the felly, and one or more layers I and I of woven wire or other foraminous material upon the grid, which comes next the bottom layer of broken stone of the filter-bed. The upper screen-engaging edges of the grid-bars are beveled or rounded to diminish or reduce the bearing-surfaces to a mere line, so that there may be free and unobstructed passage of water through every portion of the screen and bed above the same. The under sides of the radial bars are cut away and they are perforated horizontally, so that though said bars divide or partition the space beneath the filter-bed into water ways or channels there is direct communication between the latter throughout such space. Such open-work construction of the grid-bars also lightens the grid, and for this reason the circular or rim bar H is cut away and perforated. The grid is preferably formed of separate segments, each of which consists of one or more radial bars, preferably two, and a portion of the circular rim of sufficient length to unite the two bars and to reach across the space to one of the radial bars of one of the adjacent segments.

Figure 9:
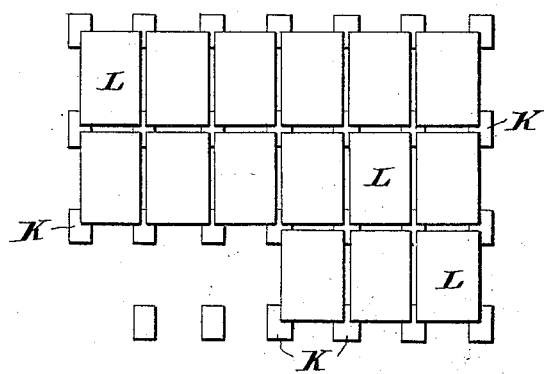

A different construction of false bottom or bed-support is shown in Figs. 8 and 9, which consists of separated bricks K and K on the tank-bottom and arched tiles L and L, whose edges rest on the bricks and upon which the filter-bed is superimposed, narrow spaces being left between adjacent tiles to form water-passages. The bricks, it will be observed, form intercommunicating water ways or channels through the space beneath the filter-bed.

I have found that the fouling of the filter-bed extends only partially therein, and hence that it is not only not necessary in cleansing or washing to agitate or stir the bed below the point where it is befouled, but it is objectionable in that there is likelihood of the dirt or sediment settling or working down into the lower part of the bed because of the loosening thereof when it is agitated or stirred throughout all or the greater part of its depth. I have also found that it is essential to the most economical use of wash-water to take off the latter at a point close to the filter-bed. I therefore stir or agitate only the upper portion of the filter-bed and draw off the water at a level close to the latter. The stirrer or agitator I employ consists of a series of fingers or teeth M and M of a length to penetrate only partially into the filter-bed, which for convenience are attached to radially-extending pipes N and N, which are mounted to rotate in the tank close to the filter-bed and which are provided with openings for the inlet of wash-water for its removal from the tank, said pipes being connected at their inner ends to a vertical pipe O, placed at the center of the tank, from which pipe runs a pipe P to a suitable place of discharge. The connection between the pipes N and N and O is a pivotal one. The pipes N and N have each a length to reach from the center of the tank to the side thereof, and each has a slot or slots n and n in one side, that extend substantially through its entire length. Said slots are gradually enlarged in size in cross-section from the inner end of the pipe outward because of the increase in the volume of water to be gathered in from the center of the tank outward. Preferably a small hole $n'$ is provided in the otherwise closed outer end of each pipe, and like holes $n^2$ and $n^2$ in the coupling which joins said pipes and the vertical pipe O. A shaft Q, attached at its lower end to the pipes and adapted to be suitably driven, is provided to revolve the pipes and stirrers. The connection between the shaft and pipes is such that the whole weight of the latter is borne by the shaft and its bearing $q$, so that no strain from this source will fall on the pipe O.

When it is desired to clean or wash the filter, a valve $b$ in the inlet-pipe B is closed and the water in the filter is allowed to run off until it reaches a level just above the pipes N and N, and then a valve $c$ in the outlet-pipe C is closed. The stirrers are now revolved to loosen up the befouled upper portion of the filter-bed, and then a valve $p$ in the wash-water-outlet pipe is opened and water is pumped through the pipe C into the filter at such a rate as not to disturb the bed, but sufficient to carry the loosened and dislodged matter up and out of the bed, where it can enter the pipes N and N, and thus be carried out of the filter. Said pipes taking the foul water in their entire length remove it with sufficient rapidity to prevent any appreciable or objectionable quantity of matter being left to settle back into the filter when the work of cleaning is stopped.

It will be observed that the draw-off pipes and stirrers are mounted in fixed relation to the bed, and hence they are not only always ready for instant operation, but both are in the exact position desired for the best and most economical washing of the bed.

Speaking with especial reference to the first-described form of false bottom or bed-support, it will be seen that in washing there is no portion of the bed or its supporting-screen to which wash-water may not have thorough access.

In the case of the purifying plant illustrated in the drawings there are two sets of filters employed, one of which receives the water from the other after it has been passed through an intermediate treating device R, and for the sake of economy in space and to utilize the pressure or head of the water the two sets of filters are placed at different levels, one set being mounted upon a suitable framework S above the other. It is to be understood, however, that as far as the structure of the filter itself is concerned the scope of my invention extends to a single filter and is not to be restricted to any number or arrangement thereof.

Having thus described my invention, what I claim is—

1. In a filter, the combination of a rotary pipe having an outlet at its inner end, and means for the admission of water to it enlarging in size from its inner to its outer end, substantially as and for the purpose described.

2. In a filter, the combination of a bed of filtering material, and a pipe for wash-water extending from the center of the bed outward, and having a water-inlet and a water-outlet, the latter being carried downward directly from the pipe, substantially as and for the purpose described.

3. In a filter, the combination of a bed of filtering material, and a pipe for wash-water above the same extending from the center of the bed outward, and having a water-inlet and a water-outlet, the latter being extended downward through the bed at its center directly from the pipe, substantially as and for the purpose described.

4. In a filter, the combination of a bed of filtering material, and a pipe for wash-water movable above such bed, that extends from the center thereof outward and has a water-inlet and a water-outlet, the latter being extended downward through the bed at its center directly from the pipe, substantially as and for the purpose described.

5. In a filter, the combination of a bed of filtering material a vertical pipe extending therethrough, and a pipe above the filter-bed, pivotally connected to and in communication with said vertical pipe and having an inlet for wash-water, the construction being such that wash-water passes directly downward into the vertical pipe from the pipe pivotally connected therewith, substantially as and for the purpose described.

6. In a filter, the combination of a bed of filtering material, and a support therefor, formed of open-bottomed segment-shaped sections, each comprising radial and curved bars, substantially as and for the purpose described.

7. In a filter, the combination of a bed of filtering material, and a support therefor, formed of segment-shaped sections having radial bars through which are water-passages, substantially as and for the purpose described.

8. In a filter, the combination of a bed of filtering material, and a support therefor, formed of segment-shaped sections, each comprising radial and curved bars, said radial bars being perforated and cut away on their under sides, substantially as and for the purpose described.

In testimony that I claim the foregoing I have hereunto set my hand this 16th day of March, A. D. 1900.

JOHN MacDOUGALL.

Witnesses:
   JAS. E. HUTCHINSON,
   CHAS. J. WILLIAMSON.